United States Patent Office 3,654,301
Patented Apr. 4, 1972

3,654,301
ADAMANTANOPYRROLE COMPOUNDS
Jiban Kumar Chakrabarti, Frimley, England, assignor to Eli Lilly and Company, Indianapolis, Ind.
No Drawing. Filed May 1, 1969, Ser. No. 821,112
Claims priority, application Great Britain, May 21, 1968, 24,089/68
Int. Cl. C07d 27/30
U.S. Cl. 260—325
2 Claims

ABSTRACT OF THE DISCLOSURE

Adamantanopyrrole compounds of the formula:

I.

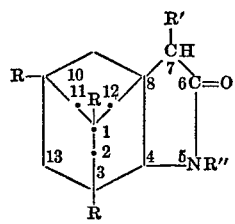

and intermediates for the synthesis of these compounds, the intermediates being of the formulae:

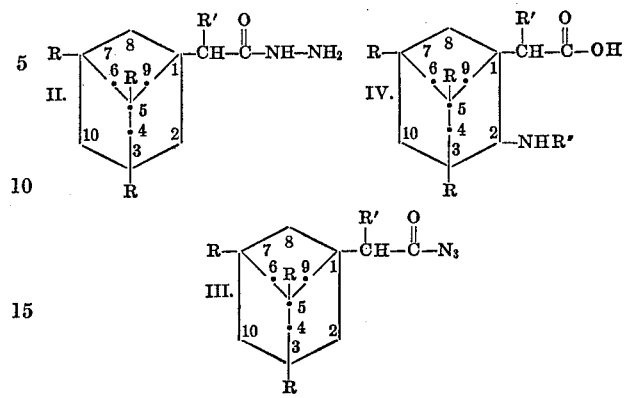

The adamantanopyrrole compounds are useful as anti-inflammatory agents and as CNS depressants.

SUMMARY OF THE INVENTION

The present invention is concerned with the preparation of certain adamantanopyrrole compounds and with intermediates useful in their synthesis. The subject matter of the present invention can more readily be understood by reference to the following summary reaction scheme:

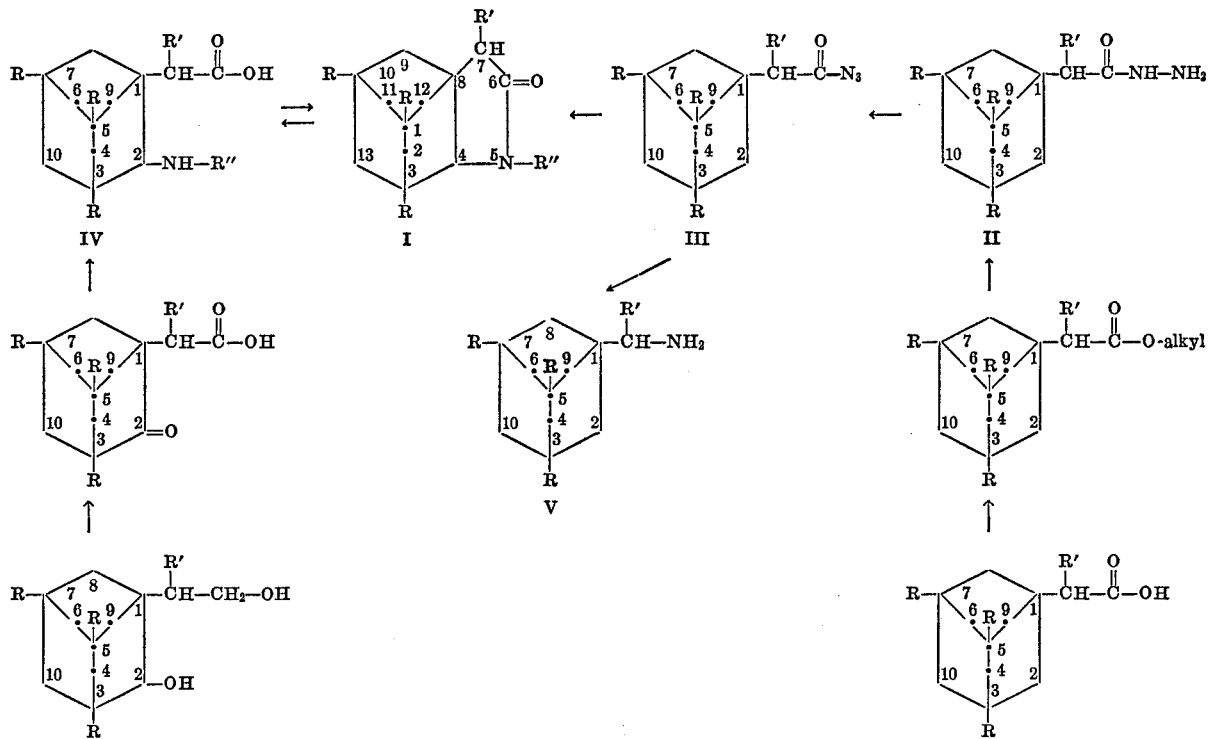

In the above and succeeding formulae in the present specification and claims, the symbol R represents hydrogen or loweralkyl of from 1 to 3, both inclusive, carbon atoms, the sum of the number of carbon atoms in all three R groups being not greater than 6; R' represents hydrogen or straight-chain alkyl of from 1 to 6, both inclusive, carbon atoms, and R'' represents hydrogen or alkyl of from 1 to 6, both inclusive, carbon atoms. The present invention is also directed to acid addition salts of the compounds of Formula IV.

Of the compounds of Formula V, that compound wherein R and R' symbols represent hydrogen is useful in accordance with U.S. Patent 3,352,912.

DETAILED DESCRIPTION OF THE INVENTION

The compounds of the present invention are named in accordance with customary chemical nomenclature. Thus, compounds of Formulae II, III, and IV, as well as starting materials for their preparation, are named as derivatives of 1-adamantaneacetic acid; compounds of Formula V are named as 1-adamantanemethylamines; and compounds of Formula I are named individually as derivatives of a tetracyclic structure.

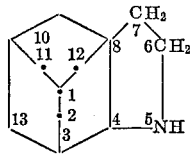

named as 5-azatetracyclo(6.3.1.1$^{3,10}$.0$^{4,8}$)tridecane. However, for the sake of convenience, the compounds of Formula I are referred to generically herein as adamantanopyrrole compounds.

Representative intermediates include the following:

Formula II 1-adamantaneacetic acid hydrazide
α-n-hexyl-1-adamantaneacetic acid hydrazide
3,5,7-trimethyl-1-adamantaneacetic acid hydrazide
α,3,5,7-tetramethyl-1-adamantaneacetic acid hydrazide
α-n-butyl-3-methyl-1-adamantaneacetic acid hydrazide
3-ethyl-5-methyl-1-adamantaneacetic acid hydrazide
α,3,5,7-tetraethyl-1-adamantaneacetic acid hydrazide
3-isopropyl-1-adamantaneacetic acid hydrazide
α-methyl-3,5-di-n-propyl-1-adamantaneacetic acid hydrazide Formula III 1-adamantylacetyl azide
α-n-hexyl-1-adamantylacetyl azide
3,5,7-trimethyl-1-adamantylacetyl azide
α,3,5,7-tetramethyl-1-adamantylacetyl azide
α-n-butyl-3-methyl-1-adamantylacetyl azide
3-ethyl-5-methyl-1-adamantylacetyl azide
α,3,5,7-tetraethyl-1-adamantylacetyl azide
3-isopropyl-1-adamantylacetyl azide
α-methyl-3,5-di-n-propyl-1-adamantylacetyl azide Formula IV 2-amino-1-adamantaneacetic acid
2-amino-1-adamantaneacetic acid hydrochloride
2-amino-α-n-hexyl-1-adamantaneacetic acid
2-amino-3,5,7-trimethyl-1-adamantaneacetic acid
2-amino-α,3,5,7-tetramethyl-1-adamantaneacetic acid
2-amino-α-n-butyl-3-methyl-1-adamantaneacetic acid
2-amino-3-ethyl-5-methyl-1-adamantaneacetic acid
2-amino-α,3,5,7-tetraethyl-1-adamantaneacetic acid
2-amino-3-isopropyl-1-adamantaneacetic acid
2-amino-3-isopropyl-1-adamantaneacetic acid sulfate
2-ethylamino-1-adamantaneacetic acid
2-isobutylamino-1-adamantaneacetic acid
2-n-hexylamino-3,5,7-trimethyl-1-adamantaneacetic acid
2-amino-α-methyl,3,5-di-n-propyl-1-adamantaneacetic acid Representative adamantanopyrrole compounds include:

5-azatetracyclo(6.3.1.1$^{3,10}$.0$^{4,8}$)tridecan-6-one
7-n-hexyl-5-azatetracyclo(6.3.1.1$^{3,10}$.0$^{4,8}$)tridecan-6-one
1,3,10-trimethyl-5-azatetracyclo(6.3.1.1$^{3,10}$.0$^{4,8}$)tridecan-6-one
1,3,7,10-tetramethyl-5-azatetracyclo(6.3.1$^{3,10}$.0$^{4,8}$)tridecan-6-one
7-n-butyl-3-methyl-5-azatetracyclo(6.3.1.1$^{3,10}$.0$^{4,8}$)tridecan-6-one
1,3,7,10-tetraethyl-5-azatetracyclo(6.3.1.1$^{3,10}$.0$^{4,8}$)tridecan-6-one
3-isopropyl-5-azatetracyclo(6.3.1.1$^{3,10}$.0$^{4,8}$)tridecan-6-one
7-methyl-1,3-di-n-propyl-5-azatetracyclo(6.3.1.1$^{3,10}$.0$^{4,8}$)tridecan-6-one
5-ethyl-5-azatetracyclo(6.3.1.1$^{3,10}$.0$^{4,8}$)tridecan-6-one
5-isobutyl-5-azatetracyclo(6.3.1.1$^{3,10}$.0$^{4,8}$)tridecan-6-one
5-n-hexyl-1,3,10-trimethyl-5-azatetracyclo(6.3.1.1$^{3,10}$.0$^{4,8}$)tridecan-6-one As indicated by the summary reaction scheme hereinabove, the ultimate adamantanopyrrole compounds of the present invention are prepared by either of two alternate series of reactions, the first series beginning with an alkyl 1-adamantaneacetate, the second series beginning with a 2-keto-1-adamantaneacetic acid compound.

In the first reaction sequence, an alkyl 1-adamantaneacetate of the formula

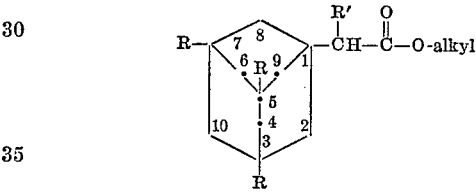

is reacted with hydrazine to convert the ester group to a hydrazide; the resulting 1-adamantaneacetic acid hydrazide:

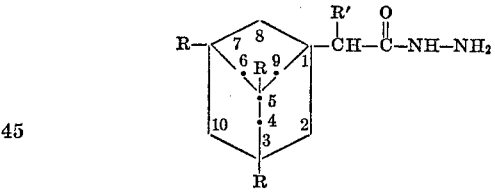

is reacted with sodium nitrite to obtain the corresponding azide:

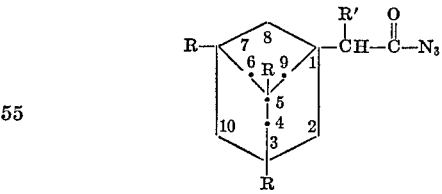

which is then converted, as, for example, by photolysis, to the ultimate adamantanopyrrole compound of the present invention:

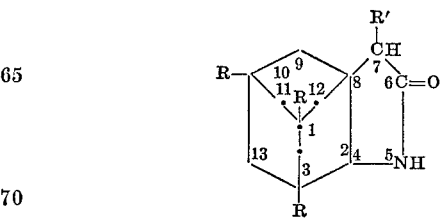

In carrying out the various reactions, known procedures are utilized. Thus, the alkyl 1-adamantaneacetate is mixed with hydrazine, conveniently in excess to serve both as reactant and as diluent, and the reaction mixture heated to reflux for a period of time; the reaction yields the corresponding hydrazide and alcohol. Thereafter, the hydrazide is separated in conventional procedures and reacted with excess sodium nitrite in glacial acetic acid. The reaction goes forward over a wide reaction temperature range, but is preferably conducted in an ice bath. The reaction produces water as by-product in addition to the desired 1-adamantylacetyl azide. The azide is separated in conventional procedures and thereafter cyclized to yield the ultimate product of the present invention, the corresponding 5 - azatetracyclo(6.3.1.1$^{3,10}$.0$^{4,8}$)-tridecan-6-one. Cyclization is effected by photolysis of the 1-adamantylacetyl azide. The photolysis proceeds through a nitrene radical (see Angew. Chem. Internat. Edit., 2, 599–608 (1963) and references there cited). In carrying out the photolysis, the azide in suitable solvent is subjected to light. The reaction is carried out at temperatures below room temperature, and preferably at temperatures of, for example, from −5 to +°5 C. The precise intensity of light is not critical; generally, usage of a mercury lamp of from 100–450 watts, or more, gives good results for laboratory-scale reactions.

The photolysis reaction described above, by which the cyclic product of Formula I is prepared, yields as a by-product the product of Formula V:

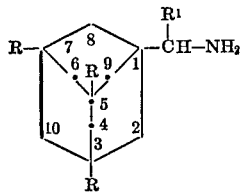

This product is produced by a Curtius-type rearrangement of the 1-adamantylacetyl azide.

Thus by the first reaction sequence are prepared all of the adamantanopyrrole compounds of the present invention wherein R″ is hydrogen.

In the second series of reactions leading to the ultimate adamantanopyrrole compounds wherein R″ is either hydrogen or alkyl as defined, a 2-keto-1-adamantaneacetic acid

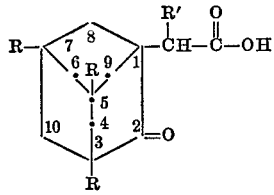

is reductively aminated to obtain the corresponding 2-amino-1-adamantaneacetic acid:

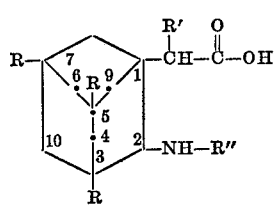

This 2-amino-1-adamantaneacetic acid is then cyclized to the ultimate adamantanopyrrole compound.

In carrying out the various reactions, known synthetic procedures are utilized. Thus, the reductive amination is carried out by reacting the 2-keto - 1 - adamantaneacetic acid with an amine of the formula NH$_2$—R″ in the presence of palladium on charcoal as catalyst. The resulting 2-amino-1-adamantaneacetic acid is then cyclized to the corresponding adamantanopyrrole compound by any of a plurality of known methods. However, the most convenient method is heating in suitable solvent, for example, a hydrocarbon such as xylene or benzene.

Whether obtained through the first or second series of reactions, the ultimate adamantanopyrrole compounds can be hydrolyzed to convert these compounds back to the 2-amino-1-adamantaneacetic acid compounds. Compounds of Formulae IV and V are readily reacted with suitable acids, such as hydrochloric acid, sulfuric acid, phosphoric acid, and other strong acids, in standard procedures to obtain the corresponding acid addition salts.

This synthesis of the intermediates and ultimate adamantanopyrrole compounds of the present invention is illustrated by the following examples.

EXAMPLE 1

Preparation of 1-adamantaneacetic acid hydrazide

Methyl 1-adamantaneacetate (16.8 grams; 0.081 mole) and hydrazine (80 milliliters) were heated together under reflux with stirring for 4 hours. After cooling, a solid mass appeared in the reaction mixture; it was separated, washed with cold water (400 milliliters), dried, and crystallized from toluene-petroleum spirit to give 1-adamantaneacetic acid hydrazide (14.5 grams; 87 percent), M.P., 111–113° C.

Analysis.—Calc. (percent): C, 69.19; H, 9.68; N, 13.45. Found (percent): C, 69.14; H, 9.75; N, 13.45.

EXAMPLE 2

Preparation of 1-adamantylacetyl azide

A solution of sodium nitrite (1.50 grams; 0.022 mole) in water (2 milliliters) was added to a stirred, ice-cold solution of 1-adamantylacetyl hydrazide prepared as described in Example 1 (2.08 grams; 0.010 mole) in glacial acetic acid (10 milliliters). After stirring for 2 minutes at 0° C., the mixture was diluted with ice water (50 milliliters) and extracted with ice-cold ether (three 50-milliliter portions). The combined ether extract was washed with ice water (30 milliliters) dried with calcium sulfate and evaporated under vacuum without heating to give crude 1-adamantylacetyl azide as an oil.

EXAMPLE 3

Preparation of 5-azatetracyclo(6.3.1.1$^{3,10}$.0$^{4,8}$) tridecan-6-one

The 1-adamantylacetyl azide obtained as reported in Example 2 was immediately dissolved in dry acetonitrile (250 milliliters) and photolyzed at 0–5° C. for 2 hours in a Hanovia photochemical reactor using a medium pressure mercury lamp. Removal of the solvent gave a yellow oil (1.7 grams) shown by gas-liquid chromatography to contain 35–50 percent of 5-azatetracyclo(6.3.1.1$^{3,10}$.0$^{4,8}$) tridecan-6-one. The infrared spectrum showed the presence of an isocyanate, 2250 cm.$^{-1}$. The oil was heated at 50° C. for 3 minutes with concentrated hydrochloric acid (10 milliliters); then the solution was diluted with water (100 milliliters) and extracted with three 50-milliliter portions of chloroform. After washing with 10 percent sodium carbonate solution (50 milliliters) and drying with magnesium sulfate, the combined extract was evaporated to give a neutral oil (1.0 gram) which was crystallized from chloroform-petroleum spirit to give 5-azatetracyclo(6.3.1.1$^{3,10}$.0$^{4,8}$)tridecan-6-one (about 30 percent yield), M.P. 110–140° C. Recrystallization from chloroform-petroleum spirit gave prisms, M.P. 153–155° C.

Analysis.—Calc. (percent): C, 75.36; H, 8.96; N, 7.32. Found (percent): C, 75.22; H, 8.77; N, 7.41.

EXAMPLE 4

Preparation of 2-amino-1-adamantaneacetic acid

A solution of 2-keto-1-adamantaneacetic acid (4.2 grams, 0.02 mole) in ethanol (50 milliliters) was saturated with ammonia at room temperature; 10 percent palladium on charcoal (0.5 gram) was added and hydrogen and further ammonia were passed into the stirred mixture. After 3 hours the catalyst was filtered off, the filtrate was evaporated and the residue was crystallized from aqueous ethanol to give the desired 2-amino-1-adamantaneacetic acid hemihydrate (3.83 grams), M.P. 214–215° C. (dec.). Recrystallization from aqueous ethanol gave prisms, M.P. 218–219° C. (dec.).

*Analysis.*—Calc. (percent): C, 66.20; H, 9.19; N, 6.42. Found (percent): C, 65.90; H, 8.91; N, 6.36.

Addition of ethanolic HCl to an ethanolic solution followed by evaporation and addition of ether gave the hydrochloride M.P. 222–225° C. (dec.).

*Analysis.*—Calc. (percent): C, 58.65; H, 8.21; N, 5.70. Found (percent): C, 58.62; H, 8.45; N, 5.79.

EXAMPLE 5

Preparatioin of 5-azatetracyclo$(6.3.1.1^{3,10}.0^{4,8})$tridecan-6-one 2-amino-1-adamantaneacetic acid (2.16 grams; 0.014 mole) was heated in o-xylene (150 milliliters) in a Dean and Stark apparatus for 6 hours. The solution was evaporated and the solid residue was crystallized from chloroform-petroleum spirit to give 5-azatetracyclo$(6.3.1.1^{3\ ,10}.0^{4,8})$tridecan-6-one (1.57 grams, 79 percent), M.P. 153–155° C. which was shown by melting point, mixed melting point and infrared spectrum to be identical with the compound produced in Example 3.

EXAMPLE 6

Preparation of 1-adamantanemethylamine hydrochloride

The procedure of Examples 1, 2, and 3 was followed up to and including the extraction of the solution of water, hydrochloric acid, and the yellow oil containing 5-azatetracyclo$(6.3.1.1^{3,10}.0^{4,8})$tridecan-6-one with chloroform. Then the acid aqueous phase after the chloroform extraction was basified with sodium hydroxide and extracted further with two 50-milliliter portions of chloroform. The extract was washed with water (50 milliliters), dried with magnesium sulfate, and evaporated to give a pale oil (0.6 g., ca. 40 percent) which was dissolved in ether and treated with ethanolic HCl to give 1-adamantanemethylamine as the hydrochloride, M.P. 290–300° C. (subliming). Recrystallization from ethanol-ether gave white plates, M.P. (sealed tube), 322–325° C. (dec.).

*Analysis.*—Calc. (percent): C, 62.9; H, 10.0; N, 6.67. Found (percent): C, 62.9; H, 9.97; N, 6.66.

EXAMPLE 7

Preparation of 2-amino-1-adamantaneacetic acid

5 - azatetracyclo$(6.3.1.1^{3,10}.0^{4,8})$tridecan-6-one (0.090 grams; 0.47 millimole) was heated with concentrated hydrochloric acid (5 milliliters) on a steam bath for 2 hours. The resulting solution was evaporated under vacuum and after washing with ether the residue (0.017 gram; 93 percent, M.P. 220–223° C. (dec.)) was crystallized from ethanol-ether to give 2-amino-1-adamantaneacetic acid hydrochloride, M.P. 228–229° C. (dec.), identical (mixed M.P. and infrared spectrum) with the hydrochloride of the amino acid prepared by reductive amination of 2-keto-1-adamantaneacetic acid.

Other representative products of the present invention, prepared in accordance with the foregoing teachings and example, are the following:

EXAMPLES 8–9

By reductive amination of 2-keto-α-n-hexyl-1-adamantaneacetic acid, there is obtained the corresponding 2-isopropylamino-α-n-hexyl-1-adamantaneacetic acid which when heated yields 5-isopropyl-7-n-hexyl-5-azatetracyclo$(6.3.1.1^{3,10}.0^{4,8})$tridecan-6-one.

EXAMPLES 10–12

By treatment of ethyl 3,5,7-trimethyl-1-adamantaneacetate with hydrazine, there is obtained 3,5,7-trimethyl-1-adamantaneacetic acid hydrazide, which upon treatment with sodium nitrite yields 3,5,7-trimethyl-1-adamantylacetyl azide. This last compound is photolyzed to yield the corresponding 1,3,10 - trimethyl - 5 - azatetracyclo-$(6.3.1.1^{3,10}.0^{4,8})$tridecan-6-one.

EXAMPLES 13–14

By reductive amination of 2-keto - α,3,5,7 - tetramethyl - 1 - adamantaneacetic acid, there is obtained the corresponding 2 - amino - α,3,5,7 - tetramethyl - 1 - adamantaneacetic acid, which when heated yields 1,3,7,10-tetramethyl - 5 - azatetracyclo$(6.3.1.1^{3,10}.0^{4,8})$tridecan-6-one.

EXAMPLES 15–16

By treatment of methyl α-n-butyl-3-methyl-1-adamantaneacetate with hydrazine, there is obtained α-n-butyl-3-methyl-1-adamantaneacetic acid hydrazide which when reacted with sodium nitrite yields α-n-butyl-3-methyl-1-adamantylacetyl azide. This last compound is photolyzed to yield the corresponding 3 - methyl - 7 - n-butyl-5-azatetracyclo$(6.3.1.1^{3,10}.0^{4,8})$tridecan-6-one compound.

EXAMPLES 17–19

By reductive amination of 2-keto - 3 - ethyl - 5 - methyl - 1 - adamantaneacetic acid, there is obtained 2-amino-3 - ethyl - 5 - methyl - 1 - adamantaneacetic acid, which upon heating yields the corresponding 3-ethyl-1-methyl-5-azatetracyclo$(6.3.1.1^{3,10}.0^{4,8})$tridecan-6-one.

EXAMPLES 20–21

2 - keto - α,3,5,7 - tetraethyl - 1 - adamantaneacetic acid is reductively aminated to obtain 2 - amino - α,3,5,7-tetraethyl - 1 - adamantaneacetic acid, which when heated yields the corresponding 1,3,7,10 - tetraethyl - 5 - azatetracyclo$(6.3.1.1^{3,10}.0^{4,8})$tridecane-6-one.

EXAMPLES 22–24

Methyl 3 - isopropyl - 1 - adamantaneacetate is treated with hydrazine to yield the corresponding 3-isopropyl-1-adamantaneacetic acid hydrazide, which is reacted with sodium nitrite to obtain 3-isopropyl - 1 - adamantylacetyl azide. This last compound is then photolyzed to obtain the ultimate product, 3 - isopropyl - 5 - azatetracyclo-$(6.3.1.1^{3,10}.0^{4,8})$tridecan-6-one.

EXAMPLES 25–26

2 - keto - α - methyl - 3,5 - di-n-propyl - 1 - adamantaneactic acid is reductively aminated to obtain 2-amino-α - methyl - 3,5 - di-n-propyl - 1 - adamantaneacetic acid, which is then cyclized with heat to 7-methyl - 1,3 - di-n-propyl - 5 - azatetracyclo$(6.3.1.1^{3,10}.0^{4,8})$tridecan-6-one.

The adamantanopyrrole compounds of the present invention are useful as anti-inflammatory agents in various inflammatory states, including arthritic conditions; the compounds are also active as CNS depressants. They are effective when administered to warm-blooded animals by any of the common routes, including oral administration, sub-cutaneous administration, and the like. Generally though, oral administration is most convenient and is therefore preferred. The compounds can be formulated to facilitate the administration of the present active agents. Thus, the compounds can be formulated in liquid or solid formulations, such as tablets, pills, capsules, granules, powders, oral solutions or suspensions, and the like. Also, where the compound serving as active agent is to be administered by a parenteral route, the compound can be formulated in a suitable injectable liquid. The exact concentration of the active agent in such formulations is not critical, it being necessary only that an appropriate dosage of the active agent, as hereinafter set forth, be supplied to the animal being treated.

In general, an anti-inflammatory effect is achieved at rates of from 1 to 250 milligrams, or more, per kilogram of animal body weight, depending upon the particular compound chosen, mode of application and the like. Generally, rates in excess of 50 to 100 milligrams are not required, and may be accompanied by side effects. Such dosages can be administered at one time, or in several administrations over a given period of time, such as daily. Desirable CNS depressant activity is achieved at rates up to 50 milligrams per kilogram by intraperitoneal administration, and at rates up to 100 milligrams per kilogram when administered orally.

The anti-inflammatory activity of the adamantanopyrrole compounds of the present invention is illustrated by the following examples.

EXAMPLE 27

5 - azatetracyclo(6.3.1.1$^{3,10}$.0$^{4,8}$)tridecan - 6 - one was evaluated for anti-inflammatory activity in accordance with a test procedure utilizing carrageenin-induced oedema of the rat foot (see, for illustration of this test method, Winter et al. Proc. Soc. Ex. Biol. Med., 111, 544–547 (1962)). Oedema in a group of rats was induced by carrageenin, and the subject compound was then orally administered on each of two subsequent occasions at the rate of 25 milligrams per kilogram of rat body weight, each time. Oedema was similarly induced in another group of rats which were subsequently given only a saline solution to serve as a control group. The degree of reduction of swelling in both the control rats and the treated rats was thereafter determined. The group of rats treated with 5 - azatetracyclo(6.3.1.1$^{3,10}$.0$^{4,8}$)tetradecan-6-one showed a 43.2 percent reduction of swelling. The control group showed none.

EXAMPLES 28–35

Results essentially the same as those obtained in Example 27 are also obtained when separately employing instead of 5 - azatetracyclo(6.3.1.1$^{3,10}$.0$^{4,8}$)tetradecan-6-one, each of the following compounds:

7-n-hexyl-5-azatetracyclo(6.3.1.1$^{3,10}$.0$^{4,8}$)tridecan-6-one 1,3,10-trimethyl-5-azatetracyclo(6.3.1.1$^{3,10}$.0$^{4,8}$)tridecan-6-one 1,3,7,10-tetramethyl-5-azatetracyclo(6.3.1.1$^{3,10}$.0$^{4,8}$)tridecan-6-one 7-n-butyl-3-methyl-5-azatetracyclo(6.3.1.1$^{3,10}$.0$^{4,8}$)tridecan-6-one 3-ethyl-1-methyl-5-azatetracyclo(6.3.1.1$^{3,10}$.0$^{4,8}$)tridecan-6-one 1,3,7,10-tetraethyl-5-azatetracyclo(6.3.1.1$^{3,10}$.0$^{4,8}$)tridecan-6-one 3-isopropyl-5-azatetracyclo(6.3.1.1$^{3,10}$.0$^{4,8}$)tridecan-6-one 7-methyl-1,3-di-n-propyl-5-azatetracyclo(6.3.1.1$^{3,10}$.0$^{4,8}$)tridecan-6-one The starting materials to be employed in the first synthetic method of the present invention:

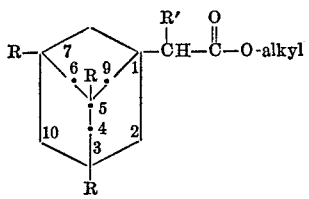

are prepared by esterification of the corresponding free acids:

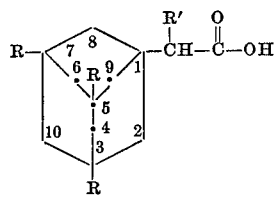

In a representative esterification, a solution of 1-adamantaneacetic acid (18.3 grams; 0.095 mole) in methanol (200 milliliters) and concentrated sulfuric acid (10 milliliters) was heated under reflux for 6 hours, diluted with water (200 milliliters) concentrated to about half of its volume and extracted with two 100-milliliter portions of ether. The combined extract was washed with 10 percent sodium carbonate solution (100 milliliters), then with water (50 milliliters), dried with magnesium sulfate, evaporated, and distilled under vacuum to give methyl 1-adamantaneacetate (16.9 grams, 86 percent), B.P., 102–112° C./2.5 mm.

*Analysis.*—Calc. (percent): C, 74.94; H, 9.68. Found (percent): C, 74.77; H, 9.72.

Of the free acid compounds, that compound wherein each R represents hydrogen and R′ similarly represents hydrogen, namely, 1-adamantaneacetic acid, is a known compound (Stetter et al., Ann., 658, page 151 (1962)). Other starting materials wherein one or more R symbols represents loweralkyl as herein defined are as readily prepared in similar manner by reacting a correspondingly substituted 1-adamantanol with dialkyl malonate and thereafter deesterifying and decarboxylating to obtain the desired compound:

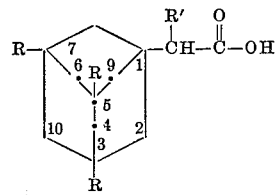

wherein one or more R symbols represents loweralkyl as herein defined. This same procedure is employed to obtain those starting materials where, regardless of the identity of the R groups, R′ represents a straight-chain alkyl group. In this embodiment, the 1-adamantanol, substituted or unsubstituted, is reacted with a dialkyl malonate bearing as a substituent the desired straight-chain alkyl group. The substituted 1-adamantanol compounds are themselves readily prepared from the corresponding substituted adamantane compounds in known methods. All of the 1-adamantaneacetic acid compounds can be reduced by reaction with lithium aluminum hydride to obtain corresponding 1-adamantaneethanol compounds.

The starting materials to be employed in the second synthetic method of the present invention:

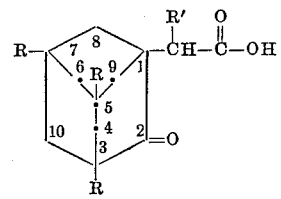

are prepared by oxidation of the corresponding 2-hydroxy-1-adamantaneëthanol compounds:

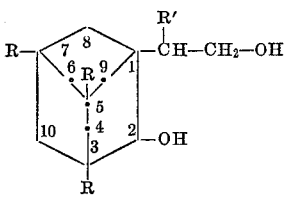

In a representative oxidation, a solution of potassium permanganate (4.2 grams; 0.027 mole) in 85 milliliters of water was added gradually to a well-stirred suspension of 2 - hydroxy-1-adamantaneethanol (3.0 grams; 0.0143 mole) in 6.6 milliliters of a 10 percent aqueous solution of sodium hydroxide. After the addition, which was carried out at room temperature, a deep green color persisted, and another solution of potassium permanganate (4.2 grams; 0.027 mole, in 85 milliliters of water) was added gradually. Thereafter, the reaction mixture was heated mildly on a steambath for about 3 hours, after which it was permitted to cool and held overnight at room temperature. The reaction mixture was then filtered from manganese dioxide and the precipitate washed with water. The combined filtrate and wash were extracted with ether. The aqueous layer was then acidified with dilute sulfuric acid, causing precipitation of the desired 2 - keto - 1-adamantaneacetic acid product. This product was extracted with ether, and the resulting ether solution washed with water, dried over magnesium sulfate, and the solution evaporated under subatmospheric pressure. The resulting product was crystallized from a mixture of ether and n-hexane to yield 2.5 grams of 2-keto-1-adamantaneacetic acid, M.P., 145–146° C.

*Analysis.*—Calc. (percent): C, 69.21; H, 7.75. Found (percent): C, 69.47; H, 7.83.

The product was converted in standard procedures to its oxime, M.P., 153–155° C.

*Analysis.*—Calc. (percent): C, 64.57; H, 7.65; N, 6.27. Found (percent): C, 65.10; H, 7.60; N, 6.10.

All of the 2-hydroxy-1-adamantaneethanol compounds are prepared in the same manner described for the preparation of 2 - hydroxy-1-adamantaneethanol in pending U.S. application for Letters Patent Ser. No. 675,037, filed Oct. 13, 1967.

Thus, in these methods are prepared all of the starting materials to be used in accordance with the present invention. In respect to synthetic methods concerning the adamantane structure, attention is also directed to a review of adamantane chemistry located in Chemical Reviews, 1964, pages 277–300 inclusive.

I claim:

1. The compound of the formula

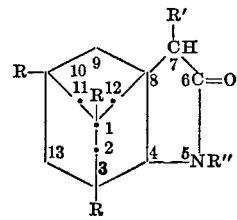

wherein R represents hydrogen or loweralkyl of from 1 to 3, both inclusive, carbon atoms, the sum of the number of carbon atoms in all three R groups being not greater than 6; and each of R' and R" independently represents hydrogen or straight-chain alkyl of from 1 to 6, both inclusive, carbon atoms.

2. The compound of claim 1 which is 5-azatetracyclo-(6.3.1.1$^{3,10}$.0$^{4,8}$)tridecan-6-one.

No references cited.

ALEX MAZEL, Primary Examiner

J. A. NARCAVAGE, Assistant Examiner

U.S. Cl. X.R.

260—349, 468 B, 514 B, 557 B, 563 P, 617 R; 424—274